March 29, 1966     D. J. EVANS     3,242,723

ULTRASONIC TRANSDUCER

Filed Sept. 27, 1962

INVENTOR.
DWIGHT J. EVANS
BY
*Head & Johnson*
ATTORNEYS

United States Patent Office 3,242,723
Patented Mar. 29, 1966

3,242,723
ULTRASONIC TRANSDUCER
Dwight J. Evans, 4113 S. Pittsburg, Tulsa, Okla.
Filed Sept. 27, 1962, Ser. No. 226,583
3 Claims. (Cl. 73—71.5)

This invention relates to an ultrasonic transducer. More particularly, the invention relates to a device for coupling ultrasonic energy waves to a structure for nondestructive testing of the structure. Still more particularly, the invention relates to a device for transmitting ultrasonically produced energy waves to a structure or object when the surface of the object at which the energy waves are to be introduced is extremely hot or cold.

In recent years ultrasonic sound waves have been used for an expanding number of purposes. One of the new applications for these above-audio sound waves is that of performing flaw or wear inspections of metallic objects. One useful application is non-destructive thickness measurement of the metal walls of pipes, tanks, ship hulls, etc., in order to determine metal loss from corrosion. The means whereby sound waves are utilized for inspections, such as inspecting welds, is well set out in the article entitled "Inspection of Welds and Materials in Service" by Dwight J. Evans, appearing in the February, 1962, issue of Welding Journal.

One of the problems connected with the use of ultrasonics to perform inspections, particularly when inspections are to be made on equipment in use, is the problem of inspecting equipment having hot surfaces. For instance, many boilers and tanks utilized in refining and chemical processes maintain a very high temperature at all times. This equipment cannot readily be taken out of service for inspection since to do so may require complete shut down of the plant. It is, therefore, important that a means be provided for measuring thickness of corroded plates, inspecting the welds, seams and other portions of structural members and vessels while such equipment is in use, which means that in many instances ultrasonic waves have to be introduced into the hot surfaces of equipment. The most commonly used method of generating an ultrasonic wave is by the electrical excitation of a quartz crystal. Unfortunately, quartz crystal, or other known piezo-electric materials used as the active agent in an ultrasonic transducer, lose their properties at temperatures ranging from 175° to about 750° Fahrenheit.

It is, therefore, one object of this invention to provide an ultrasonic transducer capable of delivering ultrasonic energy to the surfaces of members being tested when the surfaces vary from extreme hot to extreme cold temperatures.

It is frequently necessary to inspect surfaces which are irregular. One such type of surface which frequently must be inspected are the corroded surfaces of ship hulls, pipes, pressure vessels, or butt weld surfaces on tanks, vessels, etc. For the inspection by ultrasonic means to be effective and dependable, it is imperative that good coupling be provided between the wave producing transducer and the surface of the object being tested. It is thus another object of this invention to provide an ultrasonic transducer having improved means of coupling to irregular surfaces.

These and other objects and a better understanding of the invention may be had by referring to the following description and claims taken in conjunction with the attached drawings in which:

It is the purpose of this invention to provide an improved ultrasonic transducer. More specifically, but not by way of limitation, it is a purpose of this invention to provide an ultrasonic transducer comprising, in combination, a tubular body member, a piezo-electric crystal member at one end of said body member, means of retaining said piezo-electric crystal in said body member and of sealing said end of said body member, electrical conductors communicating to said piezo-electric crystal and extending exteriorly of said body member, and an ultrasonically transparent conformable structure engaging member, which is also a good thermal insulator, affixed to and sealing the opposite end of said tubular body member.

Figure 1:
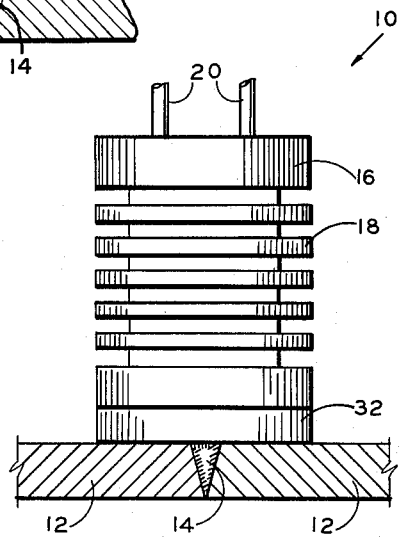
FIGURE 1 is an external view of a preferred embodiment of the invention.
Figure 6:
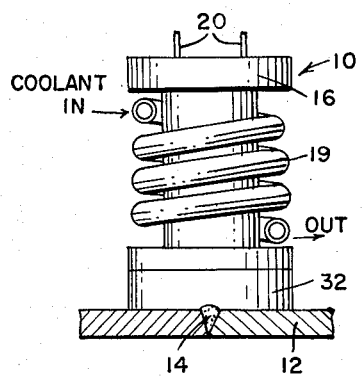
FIGURE 6 is an elevational view of another embodiment of this invention utilizing an external cooling coil.

Referring now to FIGURE 1, the ultrasonic transducer of this invention is indicated generally by the numeral 10, with the transducer 10 shown in firm contact with a structure 12 being tested. This view shows the structure 12 being tested contiguous to a weld 14. However it is to be understood that the primary object is one of thickness change measurements of corroded or eroded materials, such as plates, pipes, etc. The transducer 10 is formed of a hollow cylindrical body 16 having external, integrally formed cooling fins 18 and/or an exterior cooling coil 19 as shown in FIGURE 6. Conductors 20 provide electrical energy for the actuation of the transducer.

Figure 2:
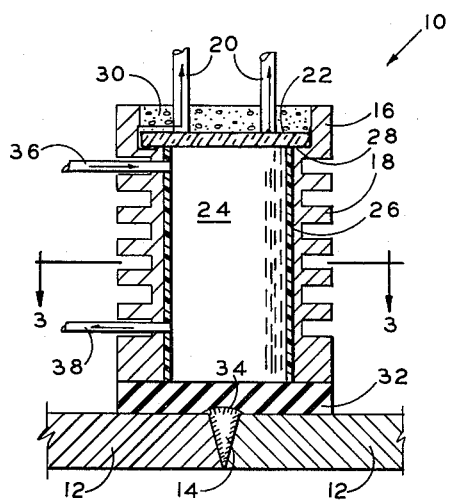
FIGURE 2 is a cross-sectional view showing the internal construction of the preferred embodiment of the transducer of this invention.

Referring now to FIGURE 2, the internal arrangement of the transducer and the main elements of novelty are best shown. High frequency sound waves, usually termed ultrasonic waves, as utilized for inspection, are generated by a piezo-electric device 22 which may be of a material such as a quartz crystal. The piezo-electric device 22 has the characteristic that when subjected to electrical potential the crystal oscillates at a high frequency, the frequency depending on various factors such as size and thickness of the crystal. The ultrasonic transducer of this invention provides a means of coupling the energy generated by the piezo-electric device 22 to the structure 12.

The tubular body portion 16 is filled with a column of a substantially incompressible liquid 24, such as water. The liquid column 24 serves as a cooling medium between the piezo-electric device 22 and structure 12 being tested. In addition, the liquid column 24 functions as an efficient conveying means to effectively convey the high frequency mechanical vibrations of the piezo-electric device 22 to the structure 12, although this is not a necessary part of this invention as element 32 serves as a thermal barrier and ultrasonically transparent material in and of itself.

Lining the inside of tubular body portion 16 is a liner 26 which is preferably of a synthetic resin material, such as manufactured under the trademark Teflon.

The piezo-electric element 22 may be supported in its proper position, sealing the end of tubular body member 16, in a variety of ways, but the preferred method is shown in FIGURE 2 wherein element 22 is positioned on a recessed face 28 with the space between the piezo-electric element and the upper end of the tubular body portion 16 filled with an epoxy resin cement 30. The use of epoxy resin cement 30 has several advantages. First, it is easily, quickly and substantially fail-safe in its application as a means of retaining the piezo-electric element 22 in proper position in the body member 16. Second, the use of epoxy cement 30 prevents leakage of liquid from the liquid column 24. Third, the piezo-electric element 22 is firmly supported within the body portion 16 whereby a substantial portion of the energy generated by the piezo-electric element 22 is caused to be transmitted to the liquid column 24.

Sealing the other end of the tubular body portion 16 is a test structure engaging element 32. This element 32 is formed, according to the principles of this invention, of a flexible and resilient material to adhere to uneven surfaces of structure 12 being tested, such as the bead 34 of a weld 14. It has been learned that the structure engaging element 32 must, for efficient functioning of the ultrasonic transducer 10, be composed of a material which is ultrasonically transparent. By the expression "ultrasonically transparent" is meant a highly efficient ultrasonic coupling wherein there is no interface reflection when the ultra-sound passes from the liquid medium through the structure engaging element 32 to the structure 12, that is, there is no reflection of the generated ultrasonic energy at the interface of the liquid column 24 and the structure engaging element 32. Accordingly, the test structure engaging element 32 is a material which has the same or substantially the same accoustic impedance as the liquid column 24. It has been discovered that a material which has all of the above mentioned characteristics is a compound of silicon rubber, such as is sold by Kirkhill Rubber Company, compound No. 950–A–583, Spec. BMS–1–18B.

Such an element 32 when formed of a compound of silicon rubber serves three primary functions. First, it serves as the primary thermal insulation barrier, assisting, in conjunction with the effect of liquid column 24, to prevent the conduction of heat to piezo-electric element 32. Second, the structure provides the function of resilience to conform to rough or uneven surfaces. Third, the compound of silicon rubber functions properly as the structure engaging element 32 since it is ultrasonically transparent. In instances not requiring thermal insulation, adiprene rubber compounds have been found to have excellent conformability.

Structure engaging element 32 is bonded or affixed to the body member 16 as by cementing it with a silicon rubber adhesive.

When the ultrasonic transducer of this invention is used to inspect a structure 12 which has an exceedingly high temperature, a further novel provision of this invention is a means whereby the piezo-electric element 22 may be maintained at a cool temperature. This is shown best in FIGURE 2 and consists in a continuous water flow across the liquid column 24 by means of a water inlet connection 36 and a water outlet connection 38. Thus the liquid column 24 can be continuously changed without in any way interfering with the efficiency of transmitting ultrasonic energy generated by the piezo-electric element 22 to structure 12. The circulation of liquid may be from a closed system which incorporates some means to cool the water, or from a continuous fresh supply.

Figure 4:
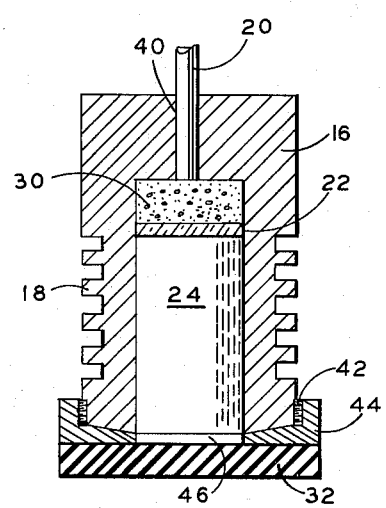
FIGURE 4 is a cross-sectional view of an alternate embodiment of this invention.

An alternate embodiment of the invention is shown in FIGURE 4. In this arrangement the tubular body member 16 is closed at one end having only a small opening 40 therein to receive electrical conductors 20. A quantity of epoxy resin cement 30 is deposited in the interior of body portion 16 to support the piezo-electric element 22.

The open end of body portion 16 is externally threaded at 42 to receive an internally threaded cap member 44 which has an opening 46 therein substantially conforming to the tubular opening of the tubular body member 16. Affixed to the exterior planar surface of cap member 44 is a conformable ultrasonically transparent structure engaging element 32. As previously mentioned relative to the embodiment of FIGURE 2, the structure engaging element 32 may be supported to cap member 44 with a cement. The structure engaging element 32 functions as has been previously described with reference to the embodiment of FIGURE 2, that is, it is a thermal insulator, a resilient material capable of conforming to the uneven surfaces of structures to be tested and is ultrasonically transparent. The embodiment of FIGURE 4 ultilizes a liquid column 24 and cooling fins 18 the same as shown in FIGURES 1 and 2. When extremely hot structures are to be inspected ultrasonically, the liquid column 24 may be a continuously changing column by the use of circulating water inlet and outlet as shown in FIGURE 2.

Although the function of the ultrasonic transducer of FIGURE 4 is the same as that shown in FIGURES 1 and 2, the embodiments of FIGURES 1 and 2 are preferred because of the simplicity of construction. The primary advantage of the embodiment of FIGURE 4 is the replaceability of the cap member 44 with its affixed structure engaging element 32. It is entirely possible that the opposite end, i.e., the end housing the transducer, can be a replaceable cap member attachable to the tubular body 16 in either of the embodiments of FIGURES 2 and/or 4.

This invention provides an ultrasonic transducer having greatly improved performance characteristics over known transducers. The discovery of the use of a compound of silicon rubber as a structure engaging element 32 has provided greatly improved effects over any other known transducer arrangement due to the unexpected ultrasonic transparency of this material. This ultrasonic transparency is particularly important in the provision of a transducer for utilization in the non-destructive inspection of structures while the structures are in use and are at extremely hot or cold temperatures. Most piezo-electric elements presently known and used are temperature sensitive, that is, they have a usefulness only at moderate temperatures and their function is impaired at low or high temperatures. This invention provides a means of utilizing such piezo-electric elements to produce ultrasonic energy and conduct such energy to structures for inspection, while the structures are in use and while at temperatures far outside the range of temperatures acceptable to the piezo-electric element.

Figure 5:
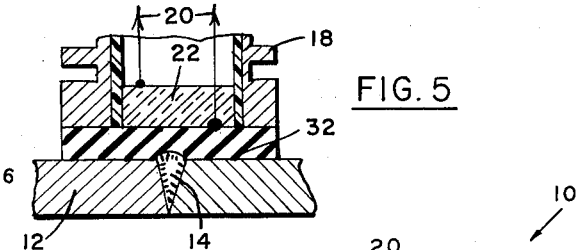
FIGURE 5 is a partial sectional view of another embodiment of this invention.
Figure 3:
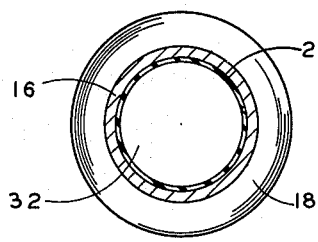
FIGURE 3 is a cross-sectional view taken along the line 3—3 of FIGURE 2.

This invention has been described with a certain degree of particularity, but it is manifested that many changes may be made in the details of construction and the arrangement of components without departing from the spirit and scope of this disclosure. For example as in FIGURE 5, the device of this invention broadly includes an ultrasonic transducer and an ultrasonically transparent, thermal insulating, and conformable member in contiguous relationship without the intermediate liquid column therebetween. Accordingly, this invention should not be limited by the disclosure but by the scope of the appended claims.

What is claimed is:

1. A low power ultrasonic transducer for measuring the physical characteristics of materials which are within a temperature range normally above the operable physical limits of piezo-electric elements, comprising:
   a tubular body member;
   a piezo-electric crystal member at one sealed end of said body member;
   electrical conductors communicating with said crystal to provide low power output thereto and extending exteriorly of said body member; and
   a barrier coupled to said crystal, said barrier having the characteristics of thermally protecting said crystal from temperatures which are above the non-piezo-electric temperature of said crystal, said barrier being ultrasonically transparent, said barrier being slightly conformable to said material when placed thereagainst, and said barrier of diameter substantially the same as said housing and extending forward thereof to sealably close the opposite end of said tubular body member.

2. A low power ultrasonic transducer for measuring the physical characteristics of materials which are of temperature normally above the operable physical limits of piezo-electric elements, comprising:
- a tubular body member;
- a piezo-electric crystal member at one sealed end of said body member;
- electrical conductors communicating with said crystal to provide low power output thereto and extending exteriorly of said body member;
- a barrier coupled to said crystal, said barrier having the characteristics of thermally protecting said crystal from said temperature, of being ultrasonically transparent, being slightly conformable to said material when placed thereagainst, and of diameter substantially the same as said housing to sealably close the opposite end of said tubular body member;
- a liquid coupling in the space between said crystal and said barrier; and
- an inlet and outlet means communicating with the interior of said tubular member to circulate said liquid in said space.

3. A low power ultrasonic transducer for measuring the physical characteristics of materials which are of temperature normally above the operable physical limits of piezo-electric elements, comprising:
- a tubular body member;
- a piezo-electric crystal member at one sealed end of said body member;
- electrical conductors communicating with said crystal to provide low power output thereto and extending exteriorly of said body member;
- a barrier coupled to said crystal, said barrier having the characteristics of thermally protecting said crystal from said temperature, of being ultrasonically transparent, being slightly conformable to said material when placed thereagainst, and of diameter substantially the same as said housing to sealably close the opposite end of said tubular body member;
- the space between said crystal and said barrier filled with a liquid to couple said crystal and said barrier; and
- the exterior of said tubular body member surrounded by at least one cooling coil.

References Cited by the Examiner

UNITED STATES PATENTS

| | | | |
|---|---|---|---|
| 2,444,312 | 6/1948 | Roberds et al. | 310—8.9 X |
| 2,505,867 | 5/1950 | Meunier | 73—67.6 |
| 2,538,114 | 1/1951 | Mason | 73—67.8 |
| 2,697,936 | 12/1954 | Farrow | 73—67.9 |
| 2,715,189 | 8/1955 | Ots | 340—10 X |
| 2,768,524 | 10/1956 | Beard | 73—67 |
| 2,789,557 | 4/1957 | Davis. | |
| 2,949,028 | 8/1960 | Joy | 73—67.9 |
| 3,079,516 | 2/1963 | Fisher | 310—8.9 |

FOREIGN PATENTS

| | | |
|---|---|---|
| 858,410 | 12/1952 | Germany. |
| 726,330 | 3/1955 | Great Britain. |

RICHARD C. QUEISSER, *Primary Examiner.*

ERNEST F. KARLSEN, JOSEPH W. HARTARY,
*Assistant Examiners.*